Nov. 19, 1940.  W. L. SCRIBNER  2,222,491
SLIDING BEARING
Filed Aug. 5, 1939
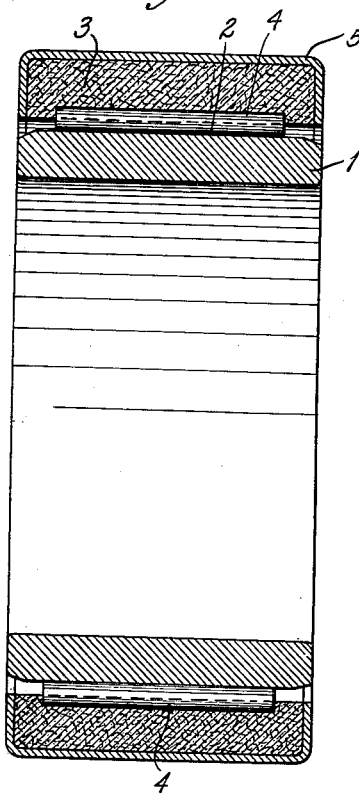
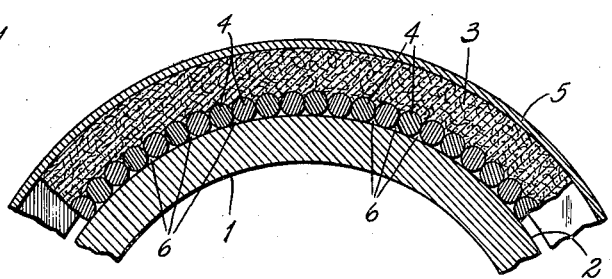
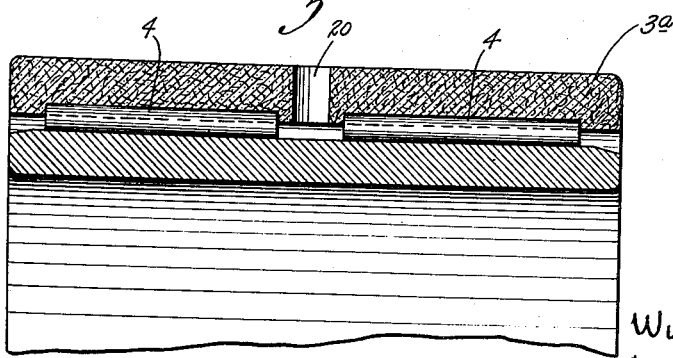
INVENTOR:
William L. Scribner,
by Carr Kerr Gravely
HIS ATTORNEYS.

Patented Nov. 19, 1940

2,222,491

UNITED STATES PATENT OFFICE 2,222,491

SLIDING BEARING

William L. Scribner, Canton, Ohio, assignor to The Timken Roller Bearing Company, Canton, Ohio, a corporation of Ohio Application August 5, 1939, Serial No. 288,483

9 Claims. (Cl. 308—239)

My invention relates to bearings of the rotary sliding type and has for its principal objects to improve the lubrication and the load carrying capacity of such bearings and to simplify the construction and reduce the expense thereof. Other objects and advantages will appear hereinafter.

The invention consists principally in molding or otherwise embedding a full annular series of bearing pins in a shell or ring of a suitable plastic. The invention further consists in the sliding bearing and in the parts and combinations and arrangements of parts hereinafter described and claimed.

In the accompanying drawing,

Fig. 1 is a longitudinal sectional view of a bearing embodying my invention,

Fig. 2 is a partial cross sectional view; and

Fig. 3 is a longitudinal sectional view of a double row bearing embodying the invention.

The bearing shown in Figs. 1 and 2 includes an inner bearing member 1 having a cylindrical raceway 2 formed on its outer periphery, a ring or shell 3 of plastic surrounding said bearing member and concentric therewith, a multiplicity of cylindrical bearing pins 4 embedded in the inner surface of said plastic ring 3 and sliding on said raceway and an outer shell or casing 5 of metal surrounding said plastic ring 3.

Preferably the inner bearing member is made of steel with the raceway portion 2 hardened and the pins 4 of cold drawn bronze; but these materials may be reversed or other suitable materials may be used. Any desired plastic may be used for the shell or ring 3 in which the bearing pins are mounted. The outer shell or casing 5 for the plastic shell 3 may be made of steel.

The bearing pins 4 are embedded in the inner surface of the plastic ring 3 with their sides in contact throughout their length and with their inner portions in engagement with the raceway to slide thereover. The wedge shaped spaces 6 between the bearing pins provide a multiplicity of oil spaces for the production of pressure films to carry the load of the bearing.

In Fig. 3 is shown a double row bearing, with two sets of pins 4 mounted in a plastic shell 3a. Said plastic shell 3a has a plurality of radial oil holes 20 opening into the space between the pins 4.

As appears from Fig. 3, the outer casing or shell may be dispensed with.

In making the bearing, the bearing pins 4 are closely packed and molded into the plastic ring 3 in any suitable way. The molding may be done with the pins mounted on a mandrel of the correct raceway diameter. Any irregularities in pin size or shape will thus be taken up in the plastic and a bearing of accurate size obtained at relatively small cost.

The above described bearing has numerous advantages. The multiplicity of pins provide a multiplicity of oil spaces and pressure films for carrying the load, thus greatly improving the lubrication of the bearing. The oil films are maintained by capillary attraction and the adhesive quality of the oil and there is little loss of oil at the ends of the bearing.

Any expansion due to heat is taken up in the plastic, so that the bearing does not bind even when heated. The plastic shell likewise absorbs shock and provides relatively large circumferential bearing contact due to its resiliency. The bearing pins are firmly held by being embedded in the plastic ring, so that no cage or other holding device is required.

What I claim is:

1. A bearing of the sliding type comprising a resilient plastic ring and a circular series of bearing pins embedded in a surface of said ring, said pins being circular in cross-section and having the sides thereof in contact throughout their length.

2. A bearing of the sliding type comprising a resilient plastic ring and a circular series of bearing pins embedded in the inner surface of said ring, said pins being circular in cross-section and having the sides thereof in contact throughout their length.

3. A bearing of the sliding type comprising a resilient plastic ring and a circular series of cylindrical bearing pins embedded in the inner surface of said ring, the sides of said pins being in contact throughout their length.

4. A bearing of the sliding type comprising a resilient plastic ring, a circular series of bearing pins embedded in the inner surface of said ring and a casing for said resilient plastic ring, said pins being circular in cross-section and having their sides in contact throughout their length.

5. A bearing of the sliding type comprising a resilient plastic ring, a circular series of cylindrical bearing pins embedded in the inner surface of said ring, the sides of said pins being in contact throughout their length and a casing for said resilient plastic ring, said casing having end flaps overlapping the ends of said resilient plastic ring.

6. A bearing of the sliding type comprising a bearing member, a resilient plastic ring concentric with said bearing member and a circular series of cylindrical bearing pins embedded in a surface of said resilient plastic ring and sliding on said bearing member, the sides of said pins being in contact throughout their length.

7. A bearing of the sliding type comprising an inner bearing member, a resilient plastic ring concentric with said inner bearing member and a circular series of cylindrical bearing pins embedded in the inner surface of said resilient plastic ring and sliding on said bearing member, the sides of said pins being in contact throughout their length.

8. A bearing of the sliding type comprising an inner bearing member, a resilient plastic ring concentric with said inner bearing member and a circular series of cylindrical bearing pins embedded in the inner surface of said resilient plastic ring and sliding on said inner bearing member, the sides of said pins being in contact throughout their length.

9. A bearing of the sliding type comprising a bearing member, a resilient plastic ring concentric with said bearing member and a circular series of cylindrical bearing pins embedded in the surface of said resilient plastic ring and sliding on said bearing member, the sides of said pins being in contact throughout their length.

WILLIAM L. SCRIBNER.